United States Patent [19]

Bauer et al.

[11] Patent Number: 5,378,754
[45] Date of Patent: Jan. 3, 1995

[54] TIRES HAVING IMPROVED ROLLING RESISTANCE

[75] Inventors: Richard G. Bauer, Kent; Donald J. Burlett, Wadsworth, both of Ohio; Johnny D. Massie, II, Lexington, Ky.; Paul H. Sandstrom, Tallmadge, Ohio; Thomas J. Segatta, Lawton, Okla.; John J. A. Verthe, Kent, Ohio

[73] Assignee: The Goodyear Tire & Rubber Company, Akron, Ohio

[21] Appl. No.: 128,441

[22] Filed: Sep. 28, 1993

[51] Int. Cl.⁶ .......................... C08K 3/04; C08L 7/00; C08L 9/00
[52] U.S. Cl. ................................. 524/514; 524/525; 524/526; 525/179; 525/184; 525/197; 525/232; 525/237; 523/351; 152/209 R
[58] Field of Search .............. 525/232, 237, 197, 184, 525/74; 523/351; 524/514, 525, 526

[56] References Cited

U.S. PATENT DOCUMENTS

| | | | |
|---|---|---|---|
| 3,965,055 | 6/1976 | Shichman et al. | 525/197 |
| 4,328,133 | 5/1982 | Ogagwa et al. | 524/518 |
| 4,937,290 | 6/1990 | Bauer et al. | 525/184 |
| 4,996,362 | 2/1991 | Pyke et al. | 525/177 |

FOREIGN PATENT DOCUMENTS

| | | | |
|---|---|---|---|
| 217159 | 5/1957 | Australia | 525/232 |
| 822621 | 10/1959 | United Kingdom | 525/197 |

*Primary Examiner*—Carman J. Seccuro, Jr.
*Attorney, Agent, or Firm*—David E. Wheeler

[57] ABSTRACT

A pneumatic tire is provided having good rolling resistance properties without sacrificing traction. The tire has a tread that contains 2 to 15 phr thermoplastic reinforcing polymer as a replacement for 5 to 25 phr carbon black.

4 Claims, 3 Drawing Sheets

TIRES HAVING IMPROVED ROLLING RESISTANCE

BACKGROUND OF THE INVENTION

The invention relates to tires that have improved rolling resistance while retaining good traction properties.

Conventionally tires are loaded with high surface area carbon black to provide good traction and good handling properties and a good cornering coefficient. A high level of fine carbon black, however, causes the tires to have a high hysteresis, which contributes to a high rolling resistance.

In the prior art, it is the general rule that improved traction can only be achieved by sacrificing rolling resistance, and rolling resistance can be improved only at the expense of traction.

In the conception of the present invention, it was proposed that if the level of carbon black was reduced, and the omitted carbon black was replaced with a filler material that reduced the hysteresis of the tread compound while maintaining stiffness, that rolling resistance could be improved, with only a slight or negligible change in traction.

It is an object of the present invention to provide a tire with improved rolling resistance, while traction is maintained.

Other objects of the invention will be apparent from the following description and claims.

SUMMARY OF THE INVENTION

A pneumatic tire is provided comprising a pair of axially spaced apart annular beads, carcass plies wrapped around the beads, reinforcing belt plies disposed over the carcass plies in a crown area of the tire, tread disposed over the belt plies in the crown area, and sidewalls disposed between the tread and beads. The tread comprises a polymer blend of 2-15 parts by weight thermoplastic reinforcing polymer per 100 parts by weight tread rubber (2-15 phr). In the illustrated embodiment, the polymer blend has a 50% modulus of 1.3 to 2.5 and a rebound of 70% to 75%.

The improved properties described herein are observed when the reinforcing polymer is mixed into the tread rubber in a two step process where reinforcing polymer domains are predeveloped in a master batch as a first step in the process. Also, the improved tire properties described are observed only when the reinforcing domains are in the ground contacting portion of the tread.

In illustrated embodiments, the thermoplastic reinforcing polymer is polyamide or polypropylene, and the tread rubber comprises polybutadiene, polyisoprene, styrene/butadiene copolymers, or mixtures thereof. The thermoplastic reinforcing polymer may be grafted to the tread rubber using a grafting agent.

It has been found that the tires of the invention have improved rolling resistance, while traction properties are substantially maintained as compared to similar tires made using conventional amounts of carbon black as a filler.

DETAILED DESCRIPTION OF THE INVENTION

Figure 1:
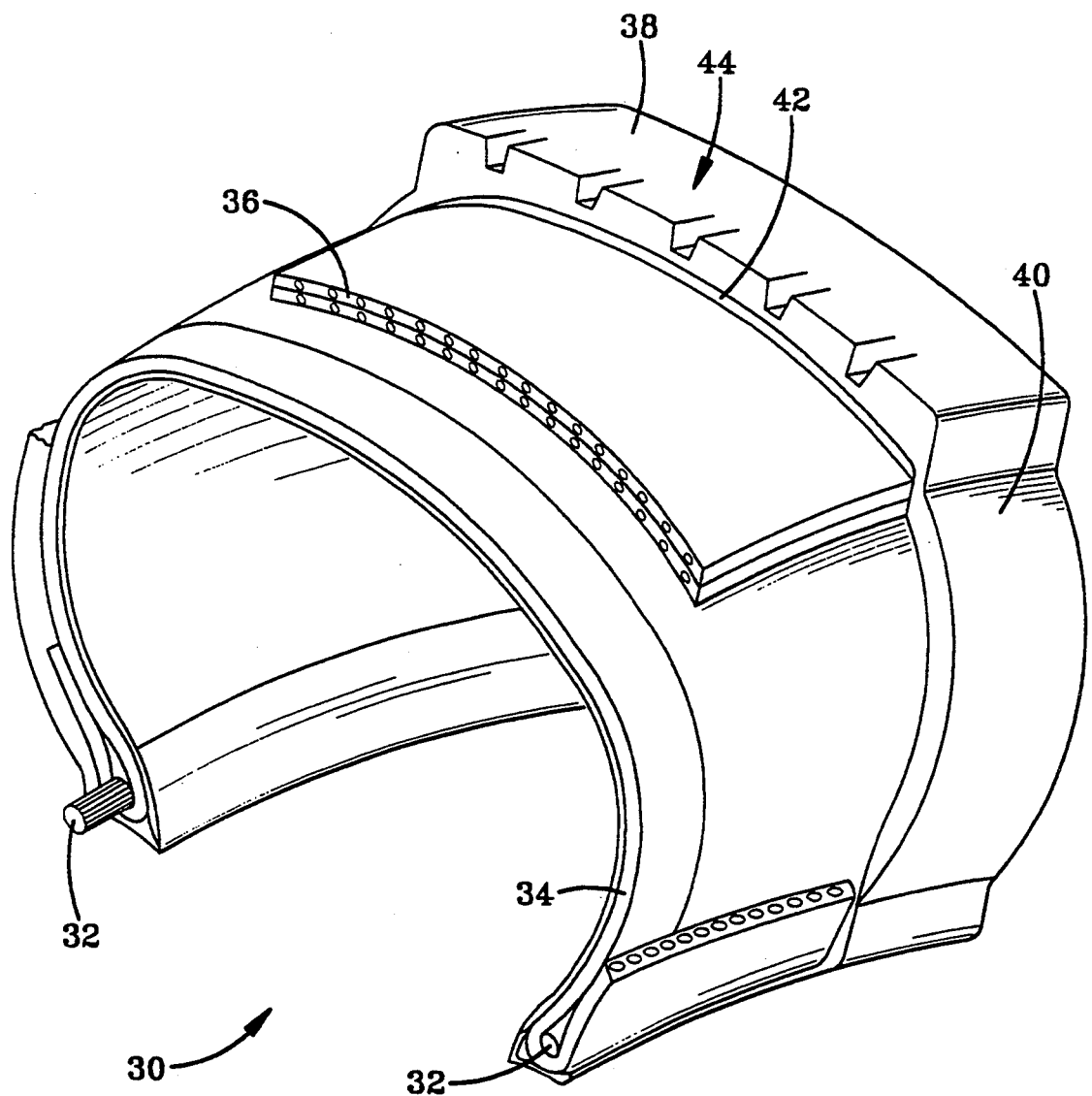
FIG. 1 illustrates a cross section of a tire delineating the tread base and tread cap.

With reference now to FIG. 1, a tire 30 of the invention is illustrated having a tread 44 comprising a tread base 42 and tread cap 38, in addition to conventional beads 32, sidewalls 40, carcass plies 34 and belts 36.

It has been found that the improved tire properties described herein are observed only when the reinforcing polymers are included in the ground contacting portion of the tread. Those skilled in the art will recognize that a tread 44 can be made of a homogeneous material, in which case there is no delineation between a tread base and a tread cap. As used herein, "tread cap" includes the ground contacting portion of a homogeneous tread.

The tread cap, in addition to conventional tread compound polymers, includes 2-15 phr thermoplastic resins. Such thermoplastic resins may be included as replacement for 5-25 phr carbon black in the tread compound.

Examples of thermoplastic resins that may be used in the tread cap compound include polyamides and polypropylene.

The polymer blends, illustrated for use in the invention for a tread cap, have a 50% modulus of 1.3 to 2.5 and a rebound of 70-75%. By contrast, the same rubber formulations, without thermoplastic resin reinforcement, and a reinforcing amount of carbon black (about 6-12 phr), have a 50% modulus of about 1.1 to 1.2 and a rebound of about 69% to about 72.5%.

The tire tread cap compounds made with the thermoplastic reinforcing polymer of the invention are prepared by a two step process. The first step involves the preparation of a polymer alloy containing thermoplastic reinforcing polymer. This process is described in U.S. Pat. Nos. 4,937,290 and 4,996,262, which are incorporated herein by reference. The second stage of the process is the blending of the polymer alloy of step one with polymers, such as rubbers, and other compounding ingredients, in conventional mixers, such as Banbury ® mixers, extruders, or a mill mixer. The second step blending or mixing can be accomplished using compounding techniques well known in the art.

In the process of producing the alloy at elevated temperatures, a micro dispersion of the alloy in the elastomer matrix is obtained. Such high temperatures cannot be achieved during normal Banbury mixing and such a micro dispersion cannot be obtained at normal temperatures, thus requiring the two-stage process.

The polymers blended with the thermoplastic alloy in the second step of the process are preferably rubbers having carbon-carbon unsaturation, which can be sulfur cured. Examples of such rubbers are cis-1,4-polyisoprene (natural or synthetic), cis-1,4-polybutadiene, 3,4-polyisoprene, styrene/butadiene copolymers, styrene/isoprene/butadiene terpolymers, butadiene/acrylonitrile copolymers and isoprene/acrylonitrile copolymers, and mixtures thereof. Generally, a mixture of two or more of natural rubber and synthetic rubbers, such as cis-1,4-polyisoprene, cis-1,4-polybutadiene, 3,4-polyisoprene, styrene/butadiene copolymers and styrene/isoprene/butadiene terpolymers is preferred.

Those skilled in the art will recognize that small amounts of additional curatives (other than sulfur), such as peroxides, can be used in the composition.

Polybutadiene rubbers having low to high vinyl content, in the range of 30% to 90%, preferably 40% to 70%, can also be used.

The styrene/butadiene copolymer rubber (SBR) can be a solution type or an emulsion polymerization rubber with a wide range of vinyl content.

Various additives can be used and mixed with the rubber composition, such as carbon black, silica, rubber processing oils, sulfur cure accelerators and retarders, antidegradants, zinc oxide, zinc stearate and/or zinc acid, and other pigments, as desired.

If desired, a third step may be used in the mixing process wherein the sulfur and accelerators are withheld from the second step, and added separately in a third step.

Other such variations in the mixing of the tread cap composition will be apparent to those skilled in the art.

Polymer alloys of the invention may be used in any part of a tire where elastomers are used, but to enhance rolling resistance properties while maintaining traction, it is preferred that the alloys be used in the tread cap. No significant improvement in rolling resistance properties was observed when the alloys of the invention were tested in the tread base 42 of a tire while conventional tread rubbers were used in the tread cap 38 of the tire.

High modulus and high rebound properties in an elastomer contribute to low rolling resistance when such an elastomer is used in a tire tread. Low rebound (high hysteresis) elastomers are generally preferred in a tire tread when high traction properties are desired. When rebound properties of an elastomer are low, in general, the modulus properties of the elastomer are low. It is theorized, in accordance with the present invention, that if an elastomer can be made having low rebound properties and high modulus properties, and is used in the tread of a tire, that overall improvement in the rolling resistance and the traction of a tire can be obtained.

Figure 2:
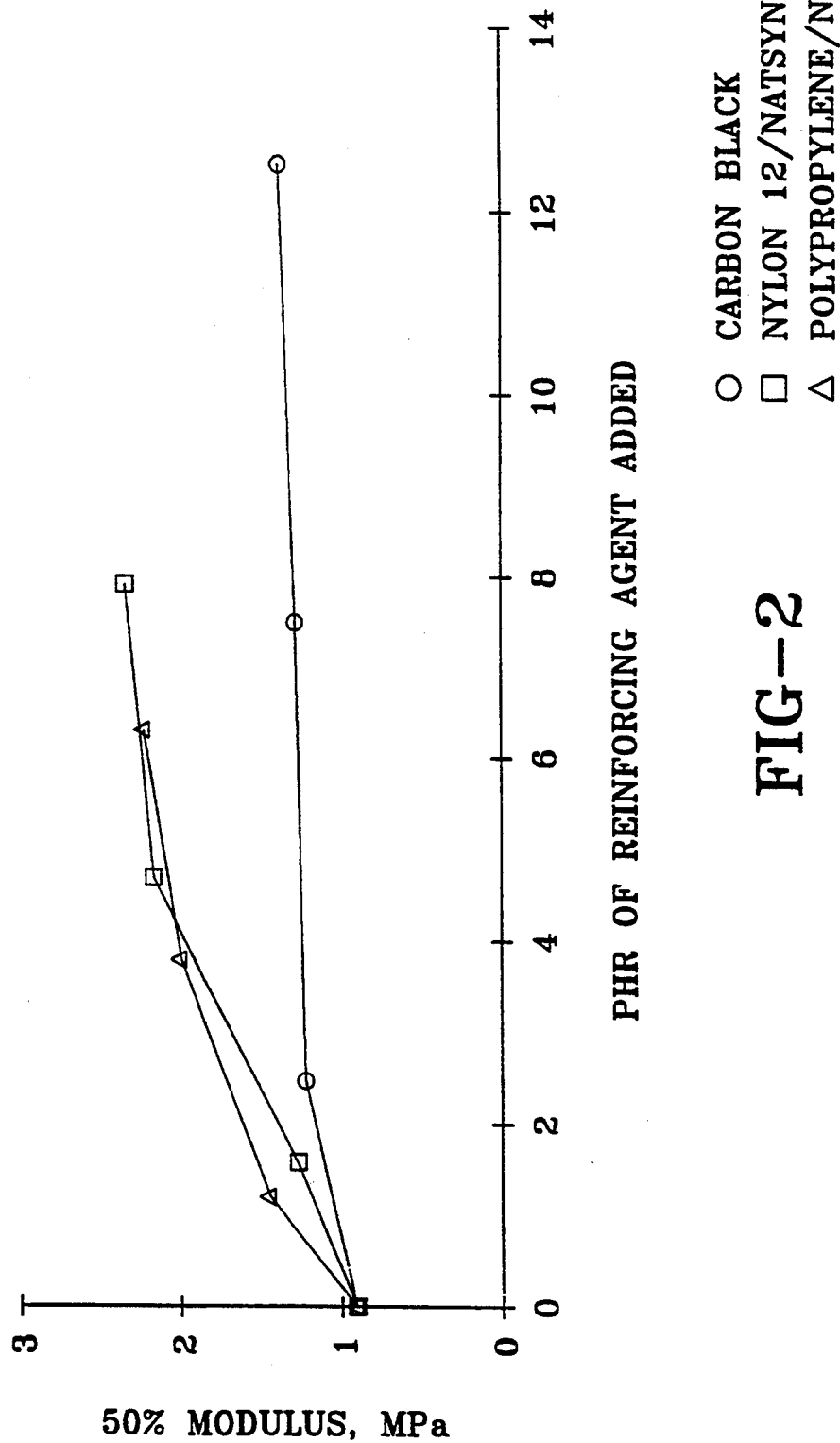
FIG. 2 illustrates the 50% modulus of various rubber compositions loaded with carbon black and/or thermoplastic polymer.
Figure 3:
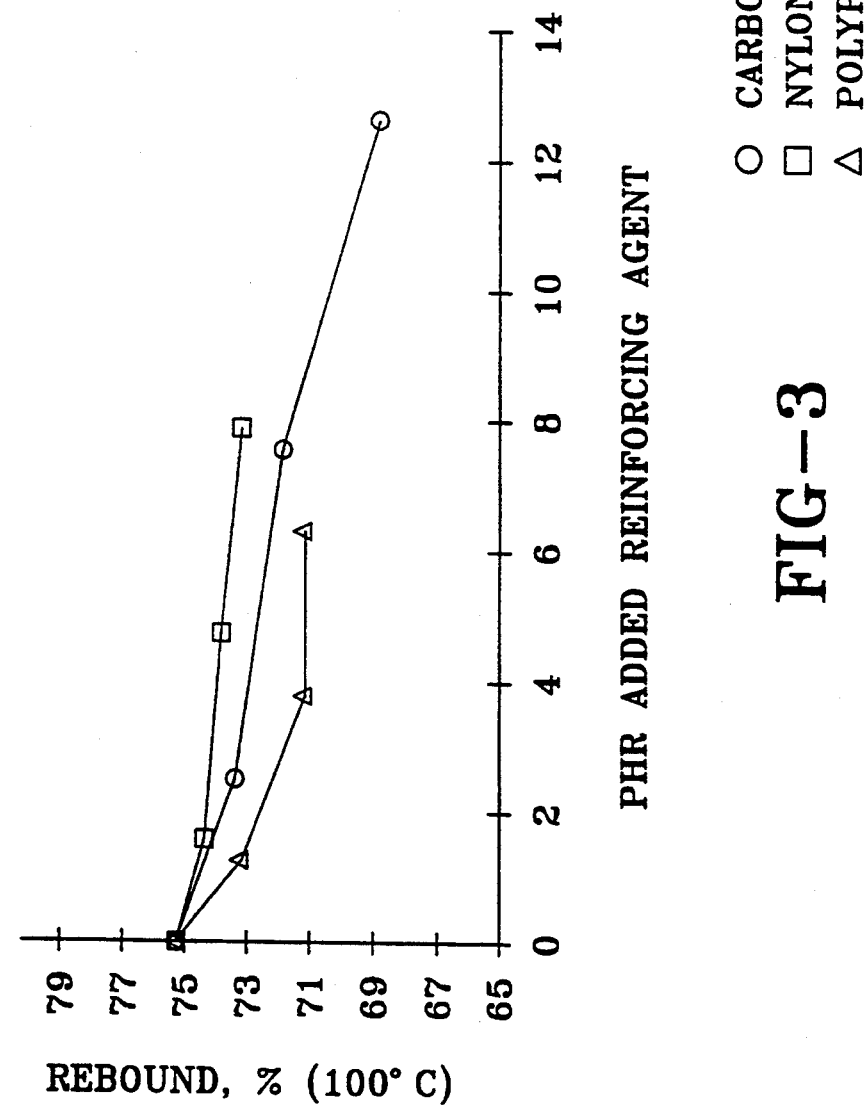
FIG. 3 illustrates the rebound properties of the same compounds represented in FIG. 2.

With reference now to FIGS. 2 and 3, the 50% modulus properties and the rebound properties of the experimental compounds described in the examples are illustrated.

As can be seen in FIG. 2, the 50% modulus of polymer blends that are filled with nylon 12 and polypropylene microfibers are increased substantially over the modulus of the same polymer that is filled with carbon black as a reinforcing agent. Meanwhile, as can be seen in FIG. 3, the rebound properties of the same elastomer filled with nylon 12 are slightly higher than the properties of carbon black filled elastomer, and the rebound properties of the polymer reinforced with polypropylene are slightly lower than the rebound properties of polymer reinforced with carbon black. From this data it can be theorized that the rolling resistance properties of a tire made using the thermoplastic filled polymer in the tread would have substantially improved rolling resistance properties, while traction properties would be held substantially constant.

It has been found, in accordance with the concept discussed above, that the tires of the invention have improved rolling resistance, and traction properties are substantially maintained, when compared to control tires having the same construction and conventional tread compounds without thermoplastic polymer reinforcement, as illustrated with reference to the following examples.

EXAMPLE 1

A polypropylene/polyisoprene alloy was produced on a Berstorff 43 mm co-rotating twin-screw extruder. The twin-screw extruder was operated at 55 rpm using a screw design heated in such a manner as to provide the product at an extrudate temperature of about 400° F. The starting materials were introduced using loss-in-weight feeders and were introduced in the first barrel section. The overall feed rate of materials was 30 pounds/hr with the following individual feed rates: 8.96 pounds/hr of polypropylene (42.8 phr), 20.94 pounds/hr of polyisoprene (100 phr) and 0.33 pounds/hr of thiodiphenylamine (1.5 phr). The product was extruded through a slit die into a cooled-water trough. Subsequently, the product was air dried and chopped using a mechanical chopper.

EXAMPLE 2

A nylon 12/polyisoprene alloy was prepared in much the same manner as described in Example 1. The same general equipment set-up was used. The overall feed rate of material was the same with the following individual feed rates used: 5.98 pounds/hr of nylon 12 (20 phr), 23.8 pounds/hr of polyisoprene (100 phr) and 0.46 pound/hr of a mixture of dithiodipropionic acid (1 phr), thiodiphenylamine (0.2 phr) and an antioxidant (0.75 phr). The barrel temperatures were adjusted to yield a product with an extrudate temperature of about 450° F. All other operations were the same as in Example 1.

EXAMPLE 3

A control rubber composition containing the materials set out in Table I was prepared in a laboratory Banbury ® mixer using two separate stages of addition.

The basic rubber formulation illustrated in Table I was used in all the examples illustrated herein, unless otherwise stated. Nat 2200 is Natsyn ® rubber.

TABLE I

| MATERIAL | WEIGHT PARTS | BANBURY STAGE |
|---|---|---|
| NAT 2200 ®[(1)] | 100.0 | 1 |
| Carbon Black[(2)] | 30.0 | 1 |
| Santoflex 13[(3)] | 2.0 | 1 |
| Fatty Acid | 2.0 | 1 |
| Zinc Oxide | 3.0 | 1 |
| Processing Oil | 5.0 | 1 |
| Sulfur | 1.2 | 2 |
| Santocure ® NS[(4)] | 1.6 | 2 |
| Santogard ® PVI[(5)] | 0.5 | 2 |

[(1)]A high cis-1,4-polyisoprene rubber commercially available from The Goodyear Tire & Rubber Company
[(2)]ASTM N-299
[(3)]N-1,3-dimethylbutyl-N'-phenyl-p-phenylenediamine (Monsanto)
[(4)]N-t-butyl-2-benzothiazylsulfenamide (Monsanto)
[(5)]N-(cyclohexylthio) phthalimide A series of experimental rubber compositions containing various levels of polypropylene/polyisoprene alloy (Example 1) and nylon-12/polyisoprene alloy (Example 2) were also prepared in the same Banbury ® mixer (see compounds A–G in Table II). A second series of experimental rubber compositions containing higher levels of carbon black were prepared to compare the reinforcing properties of the alloys in polyisoprene with the properties of polyisoprene filled with standard carbon black (see compounds H–J in Table II). Cure behavior and cured properties of the control and experimental compounds are shown in Table II.

All ingredients are listed in parts by weight per hundred parts rubber (phr).

TABLE II

| SAMPLE # | A | B | C | D | E | F | G | H | I | J |
|---|---|---|---|---|---|---|---|---|---|---|
| NAT 2200 | 100.0 | 100.0 | 100.0 | 100.0 | 100.0 | 100.0 | 100.0 | 100.0 | 100.0 | 100.0 |
| Polpropylene | 0 | 0 | 0 | 0 | 1.26 | 3.78 | 6.31 | 0 | 0 | 0 |
| Nylon-12 | 0 | 1.58 | 4.74 | 7.91 | 0 | 0 | 0 | 0 | 0 | 0 |
| Carbon Black | 30.0 | 30.0 | 30.0 | 30.0 | 30.0 | 30.0 | 30.0 | 32.5 | 37.6 | 42.6 |
| Rheometer, 150° C. | | | | | | | | | | |
| Max Torque | 30.0 | 31.5 | 34.4 | 37.5 | 30.8 | 31.6 | 32.7 | 31.0 | 33.2 | 34.8 |
| Min Torque | 7.0 | 7.2 | 7.6 | 8.1 | 7.2 | 7.3 | 8.2 | 7.2 | 7.9 | 8.2 |
| Delta Torque | 23.0 | 24.3 | 26.8 | 29.4 | 23.6 | 24.3 | 24.5 | 23.8 | 25.3 | 26.6 |
| $T_{90}$, Minutes | 23.3 | 21.5 | 19.8 | 19.1 | 23.3 | 23.3 | 22.7 | 23.3 | 21.8 | 20.9 |
| Hardness | | | | | | | | | | |
| RT | 50.4 | 53.6 | 58.7 | 62.8 | 52.4 | 56.1 | 59.7 | 52.3 | 55.5 | 57.6 |
| 100° C. | 47.9 | 49.6 | 53.6 | 57.3 | 50.0 | 52.7 | 54.7 | 49.2 | 52.2 | 53.5 |
| Rebound | | | | | | | | | | |
| RT | 63.1 | 63.9 | 62.1 | 61.7 | 62.4 | 61.1 | 59.5 | 61.7 | 58.5 | 54.2 |
| 100° C. | 75.3 | 74.3 | 73.8 | 73.1 | 73.1 | 71.7 | 71.1 | 73.4 | 71.8 | 68.8 |
| Stress-Strain | | | | | | | | | | |
| Tensile at Break | 24.3 | 23.5 | 22.5 | 21.8 | 24.2 | 22.4 | 22.3 | 25.1 | 25.0 | 24.7 |
| Elongation at Break | 668 | 646 | 605 | 571 | 658 | 604 | 583 | 665 | 641 | 621 |
| Modulus, 100% | 1.3 | 1.6 | 2.3 | 3.1 | 1.6 | 2.1 | 2.7 | 1.4 | 1.6 | 1.7 |
| Modulus, 300% | 5.9 | 6.7 | 8.2 | 9.8 | 6.8 | 8.2 | 9.7 | 6.6 | 7.8 | 9.0 |

The key properties, 50% modulus from stress-strain measurements, and rebound at 100° C., are plotted in FIGS. 2 and 3, respectively. These properties are considered critical for the use of such compositions in tire tread applications. The modulus data would relate to treadwear and handling properties in a tire, and the rebound data would relate to rolling resistance, and ultimately fuel consumption. It is clearly evident from FIG. 2 that either polypropylene or nylon-12 reinforce a polyisoprene composition better than carbon black, at equal part addition compared to a control compound containing 30 phr carbon black. Compare also the data for compounds B–G with the data for compounds H–J in Table II.

The conventional level of carbon black in a tread compound is 30 to 80 phr.

It is illustrated in FIG. 3 that the addition of nylon-12 to polyisoprene does not have a negative effect on the rebound properties of the composition, which would indicate, together with the modulus data, that a tire made using such an alloy in the tire tread would have improved rolling resistance, or fuel economy, as compared to a tire made having a tread compound which uses carbon black as a reinforcing agent.

The addition of polypropylene in the composition does not clearly demonstrate the improved rolling resistance of the composition. A careful look at the rebound and modulus data, however, suggests that the addition of 6.31 phr polypropylene, in place of 12.6 phr carbon black, provides equal hardness, and higher modulus with higher rebound. This suggests an improved rolling resistance.

EXAMPLE 4

Pneumatic tires of conventional construction were built, shaped and cured in a conventional tire mold. The tread was built onto the uncured carcass as a pre-extruded element. The tires were P195/75R14, which indicates that they were belted, radial ply passenger tires. The treads of all of the tires comprised a blend of natural rubber and solution polymerized SBR. Three tire constructions were evaluated using similar tread cap compositions that differed from each other as indicated in Table III. In the table, tire AA is the control and the tread is reinforced with carbon black at a level of 43 phr. In tire BB, the level of carbon black in the tread rubber was reduced to 33 phr, and 1.8 phr of nylon 12 was added. In tire CC, the carbon black level was reduced to 34.5 phr, and 4.3 phr nylon 12 was added.

TABLE III

| SAMPLE | AA | BB | CC |
|---|---|---|---|
| Carbon Black | 43.0 | 33.0 | 34.5 |
| Nylon-12 | 0 | 1.8 | 4.3 |
| Tensile at Break, MPa | 17.6 | 16.8 | 16.8 |
| Elongation at Break, % | 450 | 465 | 440 |
| Modulus, 300% | 11.6 | 10.5 | 11.9 |
| Rebound, 100C | 63.5 | 68.4 | 67.2 |
| Tire Data* | | | |
| Rolling Resistance (67" Wheel) | 100 | 104 | 104 |
| Wet Skid Resistance (20 mph) | 100 | 102 | 100 |
| | 100 | 99 | 99 |

*Higher values than control (100) indicate improved traction or rolling resistance whereas lower values indicate inferior traction or rolling resistance.

Included in Table III are tire performance properties relative to rolling resistance and wet skid. The tire results indicate that the replacement of carbon black by Nylon-12 in the tread composition will provide improvements in rolling resistance, with only minor changes in traction.

While specific embodiments of the invention nave been illustrated and described, those skilled in the art will recognize that the invention may be variously modified and practiced without departing from the spirit of the invention. The invention is limited only by the scope of the following claims.

What is claimed is:

1. A method of preparing a tire tread cap rubber composition comprising the sequential steps of
   (a) blending a rubber selected from the group consisting of cis-1,4-polyisoprene (natural or synthetic), cis-1,4-polybutadiene, 3,4-polyisoprene, styrene/-butadiene copolymers, styrene/isoprene/butadiene terpolymers, butadiene/acrylonitrile copolymers, isoprene/acrylonitrile copolymers, and mixtures thereof, said rubber containing carbon black; with thermoplastic polymer selected from the group consisting of polyamide and polypropylene to form a polymer alloy having a thermoplastic polymer resin content of 15 to about 20 weight percent; and (b) blending additional sulfur curable rubber with a sufficient amount of said polymer alloy to form a rubber composition having a thermoplastic resin content of about 2 to about 15 parts by weight per hundred parts total rubber and about 30 to 34.5 parts by weight carbon black per hundred parts total rubber.

2. The method of claim 1 which comprises the step of selecting a rubber blend to contain natural rubber and SBR.

3. The method of claim 1 comprising the step of providing a load of 33 phr carbon black in the final composition.

4. The method of claim 1 comprising the step of providing a load of 34.5 phr carbon black in the final composition.

* * * * *